(12) United States Patent
Dallas et al.

(10) Patent No.: US 6,997,977 B2
(45) Date of Patent: Feb. 14, 2006

(54) ADSORPTIVE DUCT FOR CONTAMINANT REMOVAL, AND METHODS

(75) Inventors: Andrew James Dallas, Apple Valley, MN (US); Steven Alan Carter, Eagan, MN (US); Jordan Spencer Flagstad, East Bethel, MN (US); Lefei Ding, Falcon Heights, MN (US); Jon Dennis Joriman, Little Canada, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 9 days.

(21) Appl. No.: 10/839,600

(22) Filed: May 4, 2004

(65) Prior Publication Data

US 2005/0005770 A1 Jan. 13, 2005

Related U.S. Application Data

(63) Continuation-in-part of application No. 10/632,057, filed on Jul. 31, 2003.

(60) Provisional application No. 60/400,106, filed on Jul. 31, 2002.

(51) Int. Cl.
*B01D 53/04* (2006.01)
(52) U.S. Cl. .................. 96/153; 96/154; 55/385.3; 55/DIG. 5; 123/519
(58) Field of Classification Search ........... 55/385.1, 55/385.3, DIG. 5; 96/108, 135, 153, 154; 123/518–520
See application file for complete search history.

(56) References Cited

U.S. PATENT DOCUMENTS 2,038,071 A 4/1936 Wilhelm

| | | |
|---|---|---|
| 2,907,075 A | 10/1959 | Newby |
| 3,094,492 A | 6/1963 | Miller et al. |
| 3,454,502 A | 7/1969 | Hiltgen et al. |
| 3,664,095 A | 5/1972 | Asker et al. |
| 3,721,072 A | 3/1973 | Clapham |
| 3,813,347 A | 5/1974 | Hayes |
| 3,965,695 A | 6/1976 | Rush et al. |
| 4,051,098 A | 9/1977 | Takemura et al. |
| 4,155,123 A | 5/1979 | Popper |
| 4,510,193 A | 4/1985 | Blucher et al. |
| 4,517,308 A | 5/1985 | Ehlenz et al. |
| 4,665,050 A | 5/1987 | Degen et al. |
| 4,678,771 A | 7/1987 | Beitinger et al. |
| 4,701,198 A * | 10/1987 | Uranishi et al. .............. 96/148 |
| 4,843,739 A | 7/1989 | von Blücher et al. |
| 4,954,465 A | 9/1990 | Kawashima et al. |
| 5,009,308 A | 4/1991 | Cullen et al. |
| 5,033,465 A | 7/1991 | Braun et al. |
| 5,098,621 A | 3/1992 | Hermann |
| 5,148,337 A | 9/1992 | Cullen et al. |
| 5,154,960 A | 10/1992 | Mucci et al. |

(Continued)

FOREIGN PATENT DOCUMENTS

DE 19814123 10/1999

(Continued)

*Primary Examiner*—Robert H. Spitzer
(74) *Attorney, Agent, or Firm*—Merchant & Gould P.C.

(57) ABSTRACT

A duct for passage of air therethough; one particular use for the duct is as a passage for intake air for a vehicle engine. The duct has an interior, adsorptive region that is adapted to remove contaminants from the air stream passing therethrough. The adsorptive region includes adsorptive material such as carbon (usually activated carbon), activated alumina, zeolites, metal oxides or ion exchange resin. The duct inhibits diffusion of uncombusted gasoline back through the duct from the engine, after the engine has been shut off.

20 Claims, 3 Drawing Sheets

U.S. PATENT DOCUMENTS

| | | |
|---|---|---|
| 5,155,146 A | 10/1992 | Reetz |
| 5,182,140 A | 1/1993 | Watanabe et al. |
| 5,212,131 A | 5/1993 | Belding |
| 5,261,169 A | 11/1993 | Willford |
| 5,288,299 A | 2/1994 | Yoshida et al. |
| 5,350,443 A | 9/1994 | von Blücher et al. |
| 5,352,274 A | 10/1994 | Blakley |
| 5,356,278 A | 10/1994 | Reetz |
| 5,372,303 A | 12/1994 | Paul |
| 5,422,138 A | 6/1995 | Watanabe et al. |
| 5,435,958 A | 7/1995 | Dinnage et al. |
| 5,474,587 A * | 12/1995 | Dias et al. .................... 264/43 |
| 5,480,621 A | 1/1996 | Breuer et al. |
| 5,505,769 A | 4/1996 | Dinnage et al. |
| 5,540,916 A | 7/1996 | Parks |
| 5,542,968 A | 8/1996 | Belding et al. |
| 5,556,030 A | 9/1996 | Paul |
| 5,558,714 A | 9/1996 | Watanabe et al. |
| 5,574,821 A | 11/1996 | Babasade |
| 5,593,482 A | 1/1997 | Dauber et al. |
| 5,599,445 A | 2/1997 | Betz et al. |
| 5,607,580 A | 3/1997 | Betz et al. |
| 5,609,756 A | 3/1997 | Betz et al. |
| 5,611,486 A | 3/1997 | Paul |
| 5,620,603 A | 4/1997 | Betz et al. |
| 5,630,937 A | 5/1997 | Betz et al. |
| 5,636,628 A | 6/1997 | Barnum |
| 5,653,875 A | 8/1997 | Betz et al. |
| 5,660,048 A | 8/1997 | Belding et al. |
| 5,683,532 A | 11/1997 | Kuma |
| 5,693,385 A | 12/1997 | Parks |
| 5,702,780 A | 12/1997 | Tiller et al. |
| 5,707,922 A | 1/1998 | Mimori et al. |
| 5,753,357 A | 5/1998 | Filipitsch et al. |
| 5,758,508 A | 6/1998 | Belding et al. |
| 5,763,335 A | 6/1998 | Hermann |
| 5,766,290 A | 6/1998 | Zievers et al. |
| 5,792,244 A | 8/1998 | Morlec et al. |
| 5,817,168 A | 10/1998 | Wheless |
| 5,824,246 A | 10/1998 | Reetz |
| 5,860,284 A | 1/1999 | Goland et al. |
| 5,890,372 A | 4/1999 | Belding et al. |
| 5,891,508 A | 4/1999 | Barnum |
| 5,924,221 A | 7/1999 | Schuver et al. |
| 5,958,098 A | 9/1999 | Heung |
| 6,025,287 A | 2/2000 | Hermann |
| 6,083,857 A | 7/2000 | Böttger et al. |
| 6,098,601 A * | 8/2000 | Reddy ........................ 123/520 |
| 6,117,218 A | 9/2000 | Snyder et al. |
| 6,120,584 A | 9/2000 | Sakata et al. |
| 6,146,451 A | 11/2000 | Sakata et al. |
| 6,165,252 A | 12/2000 | Kendall |
| 6,228,506 B1 | 5/2001 | Hosatte et al. |
| 6,231,644 B1 | 5/2001 | Jain et al. |
| 6,331,351 B1 | 12/2001 | Waters et al. |
| 6,352,578 B1 | 3/2002 | Sakata et al. |
| RE37,779 E | 7/2002 | Kuma et al. |
| 6,413,303 B1 | 7/2002 | Gelderland et al. |
| 6,432,179 B1 | 8/2002 | Lobovsky et al. |
| 6,468,428 B1 | 10/2002 | Nishii et al. |
| 2001/0029843 A1 | 10/2001 | Minoru et al. |
| 2002/0029693 A1 * | 3/2002 | Sakakibara et al. ............ 96/134 |
| 2002/0059920 A1 * | 5/2002 | Yoshioka et al. ............ 123/518 |
| 2003/0192512 A1 * | 10/2003 | Luley et al. ................. 123/519 |
| 2004/0079344 A1 * | 4/2004 | Gimby et al. ................ 123/519 |
| 2004/0099253 A1 * | 5/2004 | Tschantz ..................... 123/518 |
| 2004/0182240 A1 * | 9/2004 | Bause et al. ................... 95/146 |
| 2005/0005770 A1 * | 1/2005 | Dallas et al. ................. 96/108 |

FOREIGN PATENT DOCUMENTS

| | | |
|---|---|---|
| GB | 2050194 | 1/1981 |
| GB | 2198053 | 6/1988 |
| NL | 1001804 | 6/1997 |

* cited by examiner

FIG. 4 ent application Ser. No. 10/632,057 filed Jul. 31, 2003, which claims priority under 35 U.S.C. § 119(e) to U.S. provisional application Ser. No. 60/400,106 filed Jul. 31, 2002 and entitled "Adsorptive Duct and Methods". The entire disclosure of these applications is incorporated by reference.

ADSORPTIVE DUCT FOR CONTAMINANT REMOVAL, AND METHODS

This application is a continuation-in-part application of U.S. patent application Ser. No. 10/632,057 filed Jul. 31, 2003, which claims priority under 35 U.S.C. § 119(e) to U.S. provisional application Ser. No. 60/400,106 filed Jul. 31, 2002 and entitled "Adsorptive Duct and Methods". The entire disclosure of these applications is incorporated by reference.

FIELD

The present invention relates to an adsorption element for removing contaminants from a gaseous stream, such as an air stream.

BACKGROUND

Gas adsorption articles or elements are used in many industries to remove airborne contaminants to protect people, the environment, and often, a critical manufacturing process or the products that are manufactured by the process. A specific example of an application for gas adsorption articles is the semiconductor industry where products are manufactured in an ultra-clean environment, commonly known in the industry as a "clean room". Gas adsorption articles are also used in many non-industrial applications. For example, gas adsorption articles are often present in air movement systems in both commercial and residential buildings, for providing the inhabitants with cleaner breathing air.

Common airborne contaminants include basic contaminants such as ammonia, organic amines, and N-methyl-2-pyrrolidone, acidic contaminants such as hydrogen sulfide, hydrogen chloride, or sulfur dioxide, and general organic material contaminants, often referred to as VOCs (volatile organic compounds), such as reactive monomer or unreactive solvent. Reactive and unreactive silicon containing materials, such as silanes, siloxanes and silanols, can be particularly detrimental contaminants for some applications. Many toxic industrial chemicals and chemical warfare agents should be removed for some use applications, and must be removed from breathing air.

What is needed is a contaminant removal system that can effectively remove contaminants such as acids, bases, or other organic materials from a fluid stream.

SUMMARY OF THE INVENTION

The present invention is directed to an adsorptive item having a passage therethrough. In particular, the adsorptive item is a duct constructed for the passage of fluid, typically gaseous fluids, such as air, therethrough. The duct has an interior region adapted to remove contaminants from the air or other fluid stream by adsorbing, absorbing, trapping, retaining, reacting, or otherwise at least temporarily removing contaminants from the fluid stream. The region includes an adsorptive material, present on at least the surface of the adsorptive region. The adsorptive material traps or otherwise retains contaminants on its surface or in pores. The collected contaminants could be released or desorbed at a desired time, for example, by reactivating the adsorptive material. Various methods for reactivating the adsorptive material include increasing the air flow past the adsorptive region compared to the air flow when the adsorption occurred, increasing the temperature of the region or air stream compared to when the adsorption occurred, and applying or removing a current or a voltage to the region.

The adsorptive region or surface can be formed simultaneously with the base duct, or by subsequently applying an adsorptive material to the duct interior. Examples of suitable adsorptive material for the adsorptive region include carbon (usually activated carbon), alumina (usually activated alumina), zeolites, metal oxides and ion exchange resins. The adsorptive material is generally bound by a polymeric adhesive or resin into or to the base duct, however, mechanical attachment mechanisms, such as clips, staples, tacks, or even snap-fit or other friction fit, could be used.

The adsorptive duct of the present invention can be used in any variety of applications in which the removal of chemical contaminants from a fluid stream (typically from a gaseous stream), such as an air stream, is desired. An adsorptive air duct of the present invention is suitable in any operation or application where chemical contaminants can escape into the environment and where it is desired to inhibit the escape of these contaminants. One example application for an adsorptive air duct of the present invention is in automobile fuel system or engine induction system. For such an application, the usual contaminants removed by the adsorptive duct include hydrocarbons and petrochemicals, such as gasoline and diesel fuel.

BRIEF DESCRIPTION OF THE DRAWINGS

Referring now to the drawings, wherein like reference numerals and letters indicate corresponding structure throughout the several views.

DETAILED DESCRIPTION

Figure 1:
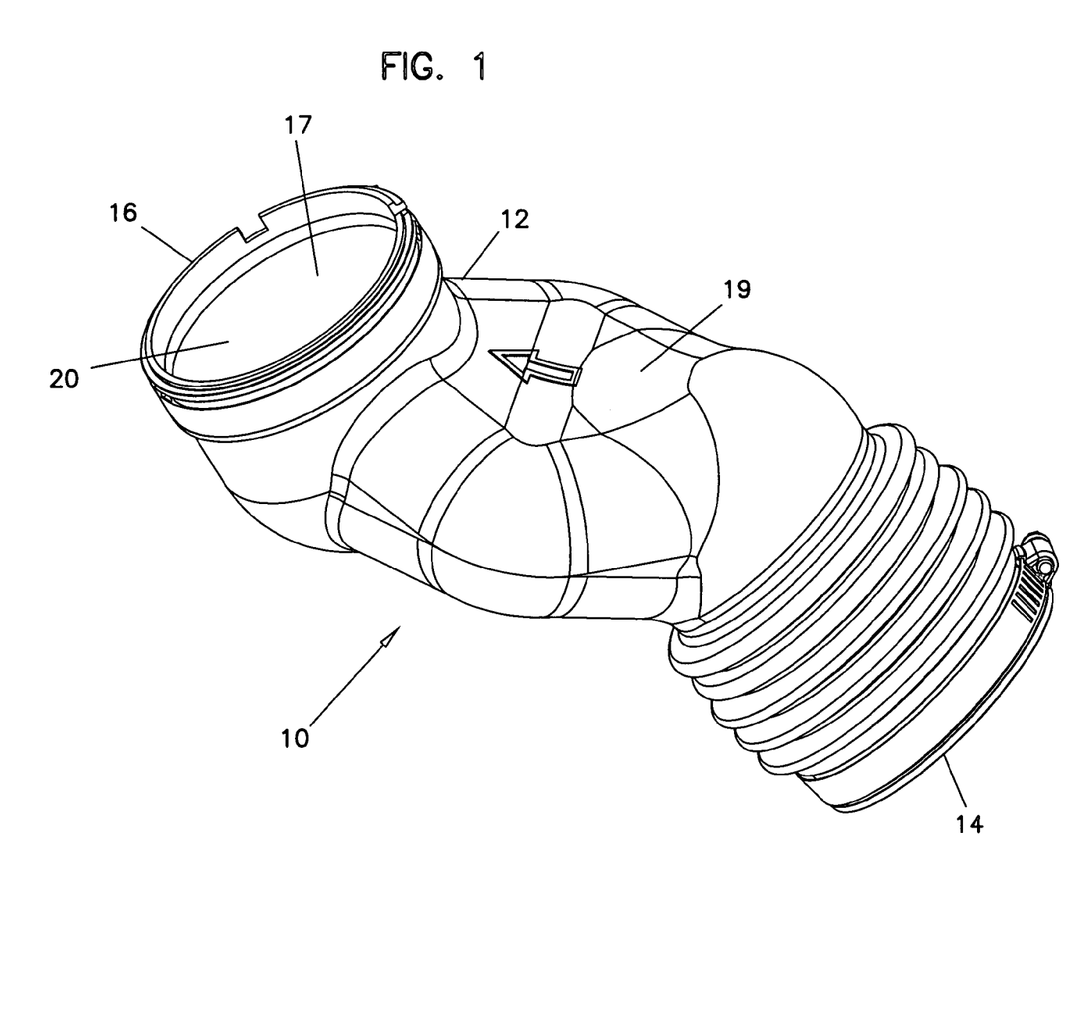
FIG. 1 is a perspective view of an air duct according to the present invention.

Referring now to the Figures, specifically to FIG. 1, an adsorptive element or article according to the present invention is shown at 10. Adsorptive element 10 is defined by a hollow body 12 having a first end 14, a second end 16, an inner surface 17 and an outer surface 19. Element 10 is configured to have fluid, such as air or another gas, flow therethrough from first end 14 to second end 16.

Body 12 is sized to allow a desired flow of air through element 10. Body 12 may have a diameter from 1 cm to over 1 meter, depending on the desired application. For automotive applications, diameters of about 5 cm to 30 cm are typical, although larger and smaller configurations of body 12 would be suitable. Other applications could have smaller or larger configurations.

Body 12 is generally at least about 1 mm thick; additionally or alternatively, hollow body 12 is generally no thicker than about 1 cm. Typically, body 12 is about 3–5 mm thick. Inner surface 17 includes an adsorptive region 20.

Adsorptive region 20 is constructed and arranged to remove a contaminant from the air or other fluid present in duct 10 by adsorbing the contaminant from the fluid stream. The term "adsorbing" and variations thereof are intended to cover any removal of a contaminant from the fluid stream, including adsorbing, absorbing, trapping, retaining, reacting, or otherwise at least temporarily removing the contaminant from the fluid stream. In some systems, it may be desired that a contaminant adsorbed by adsorptive region 20 is released or desorbed after a predetermined time period or at a desired time. Releasing or desorbing a contaminant can be accomplished by reactivating the adsorptive region or the material that provides the adsorptive properties to region 20. Methods for reactivating adsorptive region 20 include increasing the air flow past adsorptive region 20, compared to the air flow when the adsorption occurred, increasing the temperature of the region 20 or air stream, compared to when the adsorption occurred, and applying or removing a current or a voltage to region 20. Referring to FIGS. 2–4 and 5A and 5B, various embodiments of adsorptive region 20 are illustrated.

Adsorptive region 20 includes an adsorptive material 22 present at or near inner surface 17 of duct 10. Region 20 may be continuous and contiguous, or, region 20 could cover only a portion of inner surface 17, with portions of inner surface 17 without region 20 or adsorptive material 22. Adsorptive material 22 adsorbs or removes contaminants from the air or other fluid that contacts material 22. The term "adsorbs" and variations thereof are intended to cover any process that removes contaminants from the fluid stream, including adsorbing, absorbing, trapping, retaining, reacting, or otherwise at least temporarily removing the contaminants from the fluid stream. The contaminant may be physically bound to the surface or within pores of adsorptive material 22, or the contaminant may be chemically reacted with material 22. The size of the contaminants and the porosity of adsorptive material 22 may be such that contaminants enter into and become physically trapped within pores or passages within adsorptive material 22. Typically, however, the surfaces of the adsorptive material 22 chemically interact with the contaminants, thus adsorbing the contaminants at least on the surfaces of material 22. Material 22 can additionally or alternately be an oxidizing agent; oxidizing agents are materials that oxidize volatile organic compounds (VOCs) into carbon dioxide and water.

Examples of materials suitable as adsorptive material 22 include carbon (including activated carbon), activated alumina, zeolites, metal oxides, polymer particulates such as ion exchange resins, sodium bisulfate, getters, clays, silica gels, superacids and/or heteropolyacids. Adsorptive material 22 is usually present as a particulate, which includes spherical particles, semi-spherical particles, rods, regularly shaped particles, irregularly shaped particles, tubes, and the like. The particulate can be hollow or solid. Liquid oxidizing agents, in addition to or alternately to particulate oxidizing agents, can be used.

Typically, adsorptive material 22, when in the particulate form, has a tight particle size distribution; that is, the size of the particulates or particles does not vary greatly within the sample. Suitable sizes of generally spherical material 22 include 100 mesh (about 120–125 micrometers), 150 mesh (about 85 micrometers), 250 mesh (about 40 micrometers), and 400 mesh (about 20–25 micrometers). Suitable sizes of fibers or rods include diameters of about 20–50 micrometers and lengths of about 50–150 micrometers. The specific mesh size used will depend on the type of adsorptive material 22 used, and the construction by which it is present in region 20.

Examples of suitable activated carbons include 50–100 mesh activated carbon beads, 50–100 mesh activated carbon granules, and 325–400 mesh carbon powder. Carbon fibers can also be used. Examples of suitable ion exchange resins include Dowex® 50WX8-100 ion exchange resin, Dowex® 50WX8-200 ion exchange resin, Dowex® 50WX8-400 ion exchange resin, Dowex® Optipore V493, and Dowex® Optipore V503.

The concentration of adsorptive material 22 within adsorptive region 20, throughout the thickness of duct 10, from inner surface 17 to outer surface 19, is usually at least about 10% by weight. Additionally or alternatively, the concentration of adsorptive material 22 within adsorptive region 20, from inner surface 17 to outer surface 19, is no greater than about 95% by weight. The concentration should be sufficient to provide acceptable adsorptive properties to region 20 while maintaining the physical integrity of region 20. Typically, the concentration adsorptive material 22 from inner surface 17 to outer surface 19 is about 20–90% by weight. This may vary from the concentration of adsorptive material 22 at or exposed to surface 17, which is generally greater than about 20%, generally no greater than about 90%, and is typically about 40–80% of the surface area.

Figure 2:
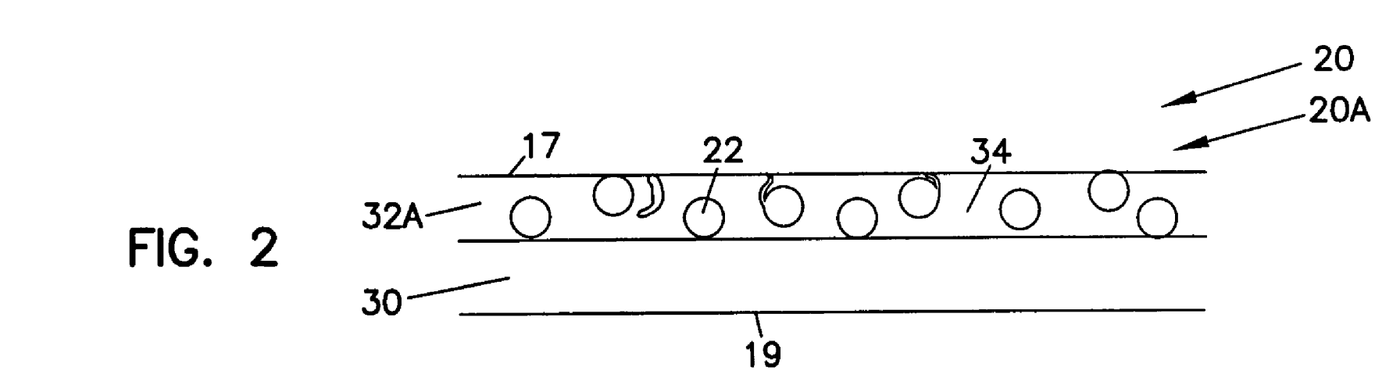
FIG. 2 is a schematic, enlarged cross-sectional view of one embodiment of a portion of the air duct of FIG. 1.
Figure 3:
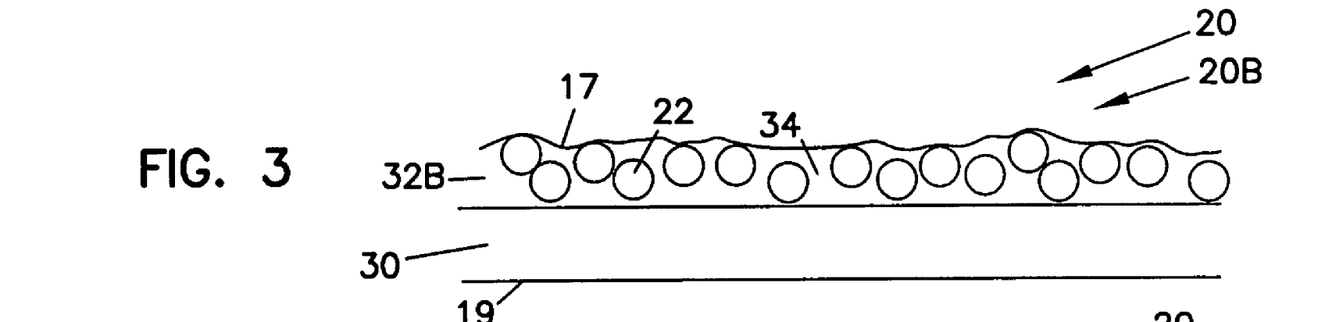
FIG. 3 is a schematic, enlarged cross-sectional view of a second embodiment of a portion of the air duct of FIG. 1.
Figure 4:
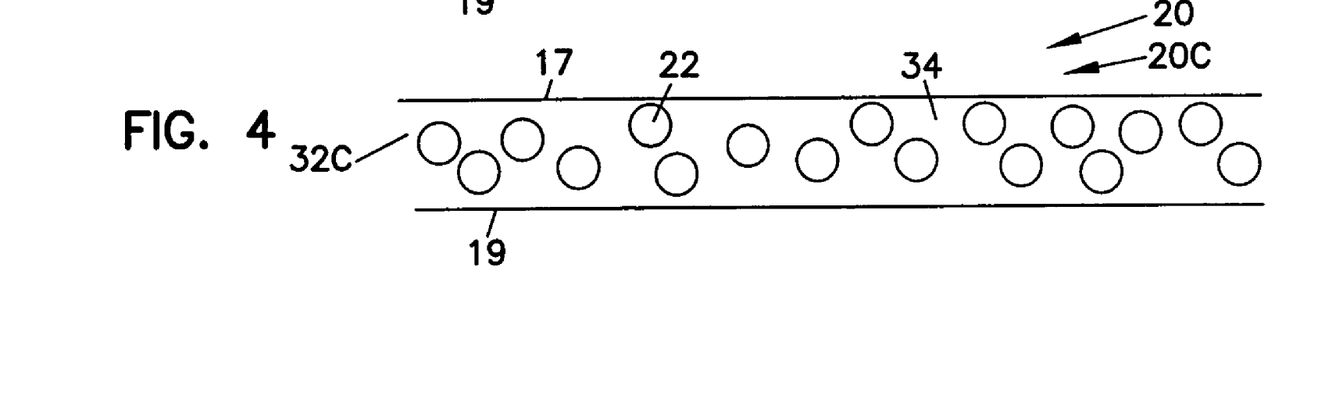
FIG. 4 is a schematic, enlarged cross-sectional view of a third embodiment of a portion of the air duct of FIG. 1.

Various specific variations of adsorptive region 20 with adsorptive material 22 are illustrated as adsorptive regions 20A, 20B, and 20C in FIGS. 2, 3 and 4, respectively. A further variation of adsorptive region with adsorptive material 22 is illustrated as adsorptive region 20D in FIGS. 5A and 5B.

A First Embodiment

Illustrated in FIG. 2 is adsorptive region 20A, a portion of duct 10 which includes a plurality of adsorptive material particles 22. Adsorptive region 20A includes a base layer 30 and an adsorptive layer 32A, the adsorptive particles 22 being present within adsorptive layer 32A.

Base layer 30, which generally forms the overall structure of body 12 and defines outer surface 19, is formed from a polymeric material, such as polyethylene, polypropylene, polyvinyl chloride (PVC), polycarbonate, nylon, polystyrene, poly(methyl methacrylate), thermoplastic elastomers (TPE), and any combinations thereof. Reinforcing materials, such as scrim, fibers and the like may be present within base layer 30. The material used for base layer 30 should have a softening point of no less than about 275° F. Base layer 30 is substantially impermeable to components commonly found in air.

Adsorptive layer 32A, present adjacent to and attached to base layer 30, defines inner surface 17. Adsorptive layer 32A includes a plurality of adsorptive particles 22 distributed throughout a polymeric material 34, such as polyethylene, polypropylene, polyvinyl chloride (PVC), polycarbonate, nylon, polystyrene, poly(methyl methacrylate), thermoplastic elastomers (TPE), thermoplastic rubbers (TPR), and any combinations thereof. The material 34 used in adsorptive layer 32A should have a softening point of no less than about 275° F. The polymeric material 34 of layer 32A can be the same material as used for base layer 30.

Adsorptive layer 32A, in some embodiments, has a "microchanneled" texture, which allows contaminants to enter below the inner surface 17 of layer 32A and become trapped, at least temporarily. By the term "microchannel" and variations thereof, what is intended is openings, channels, pores, or passages, typically no greater than about 5 nm in diameter, preferably no greater than about 2 nm in diameter, within adsorptive layer 32A, generally in polymeric material 34, that extend from surface 17 into layer 32A. The porosity of adsorptive layer 32A is intrinsic to polymeric material 34 and adsorptive material 22, and can be modified by additives or by the processing of layer 32A. A microchanneled texture generally forms when additives to polymeric material 34 have a substantially different melting point, usually at least about 50° F. different, than the primary component of layer 32A. The pores or channels may be interconnected or may be individual.

Duct 10 having adsorptive region 20A can be made by simultaneously forming base layer 30 and adsorptive region 20A. Layers in addition to base layer 30 and adsorptive region 20A can be included in duct 10; for example, an intermediate layer between base layer 30 and adsorptive region 20A can be included, for example, for promoting adhesion of region 20A and layer 30. Suitable methods for making duct 10 with adsorptive region 20A include various molding techniques and extrusion techniques. Preferred molding processes are blow molding and suction or vacuum blow molding. Suction or vacuum blow molding is well known in the art of molding for providing products with multiple layers. Injection molding, including reaction injection molding, may also be used.

When using molding techniques, the preferred size of adsorptive material 22 is about 100–325 mesh, and the concentration of material 22 in adsorptive layer 32A is about 20–90% by weight, more preferably about 40–80% by weight. Depending on the molding technique used, the thickness of adsorptive layer 32A is preferably about 0.5–1 mm and the thickness of base layer 30 is preferably about 2–3 mm. In an alternate embodiment, the thickness of adsorptive layer 32A is preferably about 5–10 mm.

A Second Embodiment

Illustrated in FIG. 3 is adsorptive region 20B, a portion of duct 10 which includes a plurality of adsorptive material particles 22. Similar to adsorptive region 20A of FIG. 2, adsorptive region 20B includes base layer 30 and an adsorptive layer 32B adjacent base layer 30, the adsorptive particles 22 being present within adsorptive layer 32B. Base layer 30 has been described above.

Adsorptive layer 32B, adjacent to and attached to base layer 30, defines inner surface 17 and includes a plurality of adsorptive particles 22 distributed throughout polymeric material 34, which has been described above.

Duct 10 having adsorptive region 20B can be made by applying adsorptive layer 32B onto base layer 30 subsequent to base layer 30 being made. Base layer 30 can be made by any number of known techniques, including molding and extrusion. Adsorptive layer 20B is usually applied to base layer 30, for example, as a coatable liquid, mixture or slurry of polymeric material 34 and adsorptive particles 22, with polymeric material 34 being, for example, a solution, a dispersion, or a hot melt. If adsorptive layer 32B is formed from a melted mixture of polymeric material 34, such as a hot melt material, and adsorptive material 22, it is preferred that prior to melting, polymeric material 34 and adsorptive material 22 have the same, or a similar, particle size.

Examples of materials suitable as polymeric material 34 for a post-coating process include hydrophilic polymer adhesives such as poly(ethylene glycol) and poly(propylene glycol), poly(vinyl alcohol), polyvinylpyrrolidone, hydroxyethyl cellulose, hydroxypropyl cellulose, etc., and hydrophobic polymer adhesives such as cellulose acetate, ethyl cellulose, polysulfone, poly(2-hydroxyethyl methacrylate), poly(vinyl acetate), etc.

The coatable mixture or slurry can be applied by spraying, dipping, painting, extrusion, or otherwise coating base layer 30 with the mixture. It may be desired to provide a primer layer, etch, or otherwise modify the surface of base layer 30 prior to applying adsorptive layer 20B.

When using a post-coating process, the preferred size of adsorptive material 22 is about 100–325 mesh and the concentration, by weight, of material 22 in adsorptive layer 32B is about 50–95%, more preferably about 90%. The thickness of adsorptive layer 32B is about 1–2 mm and the thickness of base layer 30 is about 2–3 mm. Adsorptive layer 32B, in some embodiments, has a "microchanneled" texture, which allows contaminants to enter and become trapped below the inner surface 17 of layer 32B.

A Third Embodiment

Illustrated in FIG. 4 is adsorptive region 20C, a portion of duct 10 which includes a plurality of adsorptive material particles 22. Adsorptive region 20C has an adsorptive layer 32C having adsorptive particles 22 present therein. For this embodiment, no separate or discernible base layer is present. Rather, adsorptive layer 32C forms the overall structure of body 12, defines outer surface 19, and inner surface 17.

Duct 10 having adsorptive region 20C can be made by various molding techniques and extrusion techniques. When using molding techniques, the preferred size of adsorptive material 22 is about 100–325 mesh, and the concentration by weight of material 22 in adsorptive layer 32C is about 20–90%, more preferably about 30–60%. In one configuration, the overall thickness of adsorptive layer 32C and of duct 10 is about 3–5 mm; in another configuration, the overall thickness of adsorptive layer 32C and of duct 10 is about 5–10 mm.

It is understood that other methods for forming adsorptive region 20 can be used. For example, particulate adsorptive material 22 could be electrostatically or drop coated onto a layer of adhesive on inner surface 17. As another example, heat adsorptive material 22, present at a temperature above the melting point of the material of duct body 12, could be impinged or otherwise applied to body 12; the high temperature of material 22 partially melting body 12 and adhering material 22 therein. Still another example would be to form base layer 30 and the adsorptive layer as a relatively flat sheet, and then form the flat sheet into duct 10, providing a passage for air or other fluid therethrough. The flat adsorptive layer could be made simultaneously or subsequent to flat base layer 30. A fourth embodiment, described below, illustrates an adsorptive region that is formed prior to positioning in the duct.

A Fourth Embodiment

Figure 5A:
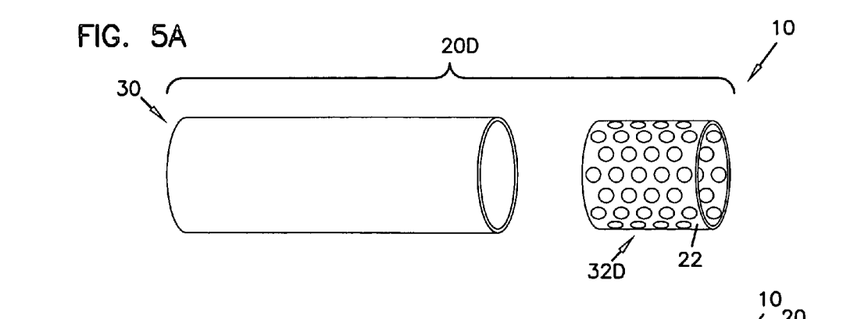
FIG. 5A is a schematic, perspective view of a fourth embodiment of portion of the air duct of FIG. 1, illustrating the duct structure and adsorptive region prior to assembly.

Illustrated in FIG. 5A is adsorptive region 20D, which includes a plurality of adsorptive material particles 22 forming an adsorptive layer 32D. For this embodiment, adsorptive region 20D is a separate layer from the base duct 30.

In such an embodiment, adsorptive layer 32D can be, for example, a sheet of adsorbent paper, adsorbent coated paper, adsorbent filter cloth, adsorbent fiber paper, adsorbent impregnated paper, or an adsorbent foam or other porous structure. Particles 22 may be present throughout layer 32D or only through a portion thereof. Layer 32D is configured to fit inside base 30 and be positioned on or close to the inner wall of base 30.

Figure 5B:
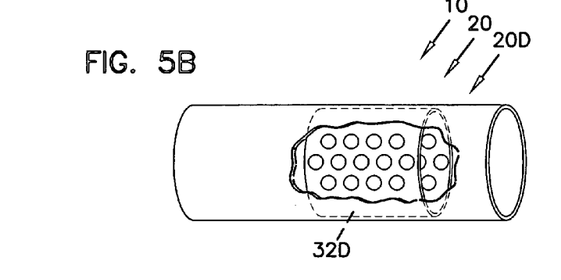
FIG. 5B is a schematic, perspective view of the duct structure and adsorptive region of FIG. 5A after assembly.

Layer 32D may be a flexible sheet, such as a paper, cloth, etc., or may be a rigid construction that generally holds its shape. A rigid layer 32D could be formed as a ring or other configuration that generally matches at least a portion of the interior shape of base 30 so that rigid layer 32D can be inserted into base 30. A rigid layer 32D could be formed from a mixture of polymeric material or other binder and adsorbent particles 22 which is then extruded or molded to the desired shape. Alternately, a rigid layer 32D could be formed by techniques that include thermal or UV curing, or that use a solvent based binder system.

Layer 32D, whether rigid or flexible, could include ridges, wings, flutes, corrugations or other projections or features that increase the surface area of layer 32D. Additionally or alternately, layer 32D could include a scrim or other material that inhibits escape of adsorbent particles 22 from layer 32D.

Layer 32D can be applied to base 30 by mechanical or chemical (adhesive) means. For example, layer 32D could be attached by clips, staples, or merely by friction fit or snap-fit. An engaging surface, projection or other element could be present on either layer 32D or base 30 to facilitate the retention of layer 32D within base 30. Layer 32D could be installed within base 30 by ultrasonic welding.

For an embodiment such as layer 32D, the size of adsorptive material 22 can be any that can adequately be retained. For example, 100–325 mesh particles could be retained in layer 32D by a slurry coating, larger mesh particles, such as 40–60 mesh, could be adhered or otherwise formed into layer 32D by molding or well known coating techniques, such as slurry coating or other adhesive coating techniques. The concentration of material 22 in layer 32D can be about 20–90% by weight. The thickness of layer 32D is usually at least 0.5 mm, preferably at least 1 mm, and often at least 5 mm. The thickness is usually no greater than 2 cm, and often no greater than 1 cm. One particular example of a preferred thickness is 7 mm.

Returning to duct 10 and adsorptive region 20, in general, adsorptive region 20 can have more than one adsorptive material 22 present; multiple materials can be mixed or be present separately in individual sections or regions. If present separately, a preferred configuration is to have the two materials positioned in series along the air flow path through duct 10. For example, adsorptive region 20 can have a first adsorptive material present closer to first end 14 and a second adsorptive material closer to second end 16. Such a configuration could be easily constructed with adsorptive layers that are separate from the duct, such as described in the fourth embodiment, above. It is understood that other constructions and arrangements of elements with various materials, impregnants, and the like can be used.

In addition to or alternate to removing hydrocarbons, adsorptive region 20 can be constructed to remove airborne basic or acidic contaminant compounds, such as organic bases (for example, ammonia, amines, amides, N-methyl-1, 2-pyrrolidone), volatile organic bases, nonvolatile organic bases, airborne acidic compounds (for example, sulfur oxides, nitrogen oxides, hydrogen sulfide, hydrogen chloride), volatile organic acids and nonvolatile organic acids, and polar or non-polar organics. Adsorptive material 22 may be selected to adsorb or otherwise remove specific contaminants, or, additives may be added to modify the adsorptive properties of adsorptive material 22 or of any of adsorptive layers 32A, 32B, 32C, 32D. Examples of additives include ion exchange resins and impregnants, which can be impregnated into material 22, especially into carbon particulate. Examples of suitable impregnants are acids, bases, or catalysts.

Adsorptive layers 32A, 32B, 32C, 32D may include a non-reactive or non-adsorbent layer as an outer layer to protect layers 32A, 32B, 32C, 32D or to inhibit loss of material 22. Such a layer should, however, be permeable to the containments intended to be removed from the fluid (e.g., air). This outer layer could be a sheet or coating. An example of a suitable layer is PTFE. A coating of PTFE solution could be applied to layers 32A, 32B, 32C, 32D by any suitable technique and then dried. Other examples of outer layers include nylon and polyester scrim.

Adsorptive region 20 may occupy the entire inner surface 17 of duct 10 or may occupy only a portion thereof. Region 20 occupies at least about 20 $cm^2$ of inner surface 17. Typically, region 20 is at least about 100 $cm^2$, preferably at least about 250 $cm^2$.

Applications for the Adsorptive Duct

Duct 10 of the present invention, made by any of the methods described above or by equivalent methods, is used for the removal of chemical contaminants from a fluid stream, such as an air stream. Examples of contaminants or active material that can be removed by duct 10 include any of hydrocarbons, petroleum products, VOCs, acidic contaminants, basic contaminants, organics, carbon monoxide and carbon dioxide, water, oxygen and ozone, nitrogen and hydrogen. One particular use for duct 10 is to remove gasoline or other petroleum vapors from an air stream.

Referring to FIG. 1 and in use, air, or other gaseous stream, enters duct 10 via first end 14, passes through body 12 coming into contact with inner surface 17 which includes adsorptive region 20, and then exits duct 10 via second end 16. It is understood that the adsorptive nature of duct 10 also exists when the air flow is in the reverse direction, from second end 16 to first end 14.

Figure 6:
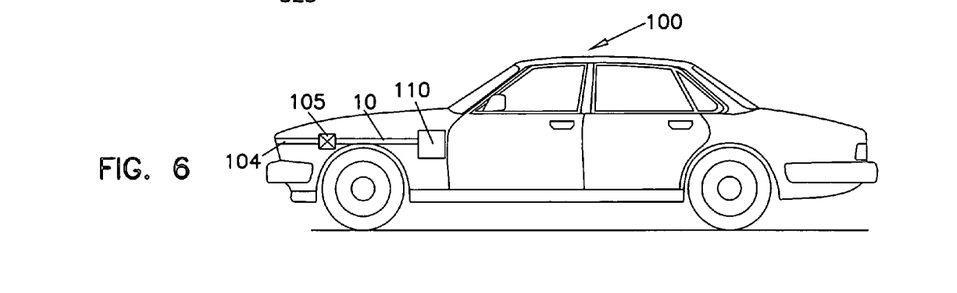
FIG. 6 is a schematic diagram of a system incorporating the air duct of FIG. 1.

A duct such as illustrated in FIG. 1 can be used in an automobile, any other type of vehicle (such as a snowmobile, tractor, motorcycle, ATV, etc.), or any other engine or power generating equipment that uses an intake air source for the combustion process. Duct 10 can be used with any combustion process fueled by gasoline, diesel fuel, methanol, ethanol, propane, natural gas, or the like. For example, a vehicle 100 utilizing duct 10 is illustrated in FIG. 6. Vehicle 100 has an air intake 104 that is connected to a conventional particulate air filter 105. Cleaned air from filter 105 passes through duct 10 to engine 110.

After the engine is shut-off and the influx of air through intake 104, filter 105 and duct 10 is essentially halted, duct 10 inhibits the release of uncombusted gasoline vapors or other petrochemicals from the engine back to the atmosphere by absorbing the molecules on absorptive region 20. That is, vapors that may diffuse or otherwise travel to duct 10 from engine 110 are adsorbed by adsorptive region 20. When the engine is restarted, the incoming flow of fresh air preferably releases the vapors adsorbed or otherwise retained in adsorptive region 20 and returns the vapors to engine 110 for combustion.

During the time when the engine is not operating, the amount of gasoline vapors passing out from duct 10 is minimal; that is, duct 10 inhibits the passage of vapors therethrough by adsorbing the hydrocarbons and other materials onto adsorptive region 20. In one preferred design, duct 10 allows no more than 82 mg of gasoline vapor per 24 hours to pass through duct 10, when exposed to 1 gram of gasoline over a total of 73 hours. In a more preferred design, duct 10 allows no more than 82 mg of gasoline vapor per 24 hours therethrough, when exposed to 1.5 grams of gasoline over a total of 73 hours.

Duct 10 can also be used in an automobile or any other type of vehicle or other engine or power generating equipment that uses an intake air source for the power source, but not necessarily a combustion process. For example, duct 10 can be used with a process obtaining power from a fuel cell.

Air, or another oxygen source, can be passed through duct 10 to remove contaminants that might be detrimental to the fuel cell catalytic process.

A suitable passageway size for duct 10, that is, the cross-section area of duct 10 taken generally parallel to first end 14 or second end 16, is greater than about 10 in$^2$ (about 65 cm$^2$), no greater than about 50 in$^2$ (about 322 cm$^2$), and is usually about 12 to 24 in$^2$ (about 77.5 to 155 cm$^2$), although this is generally designated by the air flow desired for the operation of engine 110.

As mentioned above, adsorptive region 20 may occupy the entire inner surface 17 of duct 10 or may occupy only a portion thereof. Typically, region 20 is at least 100 cm$^2$, preferably at least 250 cm$^2$, although in many embodiments the area is greater. The area of adsorptive region 20 can be designed to remove the desired amount of contaminants from the gas or air passing therethrough, based on the residence time of the gas in duct 10. For example, preferably at least 90%, more preferably at least 95% of contaminants are removed and adsorbed. In some constructions, as much as 98%, or more, of the contaminant is removed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. An adsorptive duct comprising:
   (a) a hollow duct body having a first end, a second end and a passage extending therethrough from the first end to the second end, the passage having an inner exposed surface; and
   (b) an adsorptive region present within the duct body, at least a portion of the adsorptive region defining the inner surface, the adsorptive region comprising an adsorptive material distributed throughout and retained by polymeric material and having a thickness no greater than 10 mm.

2. The adsorptive duct according to claim 1, wherein the adsorptive material comprises at least one of carbon, alumina, zeolites, metal oxides and ion exchange resin.

3. The adsorptive duct according to claim 2, wherein the adsorptive material is a particulate.

4. The adsorptive duct according to claim 1, wherein the adsorptive material occupies at least 10% by weight and no more than 95% by weight of the adsorptive region.

5. The adsorptive duct according to claim 4, wherein the adsorptive material occupies 20–90% by weight of the adsorptive region.

6. The adsorptive duct according to claim 4, wherein the adsorptive material occupies about 40–80% of the surface area of the adsorptive region.

7. The adsorptive duct according to claim 1, wherein the thickness of the adsorptive region is at least 0.5 mm.

8. The adsorptive duct according to claim 1, wherein the duct body comprises a distinct outer layer and an inner layer, the inner layer comprising the adsorptive region.

9. The adsorptive duct according to claim 1, wherein the polymeric material comprises at least one of polyethylene, polypropylene, polyvinyl chloride, polycarbonate, nylon, polystyrene, poly(methyl methacrylate), and thermoplastic elastomer.

10. The adsorptive duct according to claim 1, further including an outer layer present in the adsorptive region defining the inner surface.

11. The adsorptive duct according to claim 10, wherein the outer layer comprises PTFE.

12. A method of making an adsorptive duct, the method comprising the steps of:
    (a) forming a hollow duct body having an inner surface and defining a passage; and
    (b) forming an adsorptive region comprising an adsorptive material distributed through and retained by polymeric material, the adsorptive region being no more than 10 mm thick and defining at least a portion of the inner surface of the duct.

13. The method according to claim 12, wherein the step of forming the hollow duct body is done simultaneously with forming the adsorptive region.

14. The method according to claim 13, wherein the hollow duct body and the adsorptive region are blow molded or vacuum molded.

15. The method according to claim 14, wherein the hollow duct body and the adsorptive region are each formed as a layer.

16. The method according to claim 15, wherein the adsorptive region is a flexible sheet.

17. The method according to claim 16, wherein the flexible sheet comprises a paper or cloth.

18. The method according to claim 15, wherein the adsorptive region is a rigid layer.

19. The method according to claim 12, wherein the step of forming the hollow duct body is done before forming the adsorptive region.

20. The method according to claim 12, wherein the step of forming an adsorptive region comprises:
    (a) forming an adsorptive region comprising an adsorptive material and an outer layer, the inner surface defined by the outer layer.

* * * * *

UNITED STATES PATENT AND TRADEMARK OFFICE
CERTIFICATE OF CORRECTION

PATENT NO. : 6,997,977 B2  
APPLICATION NO. : 10/839600  
DATED : February 14, 2006  
INVENTOR(S) : Dallas et al.

It is certified that error appears in the above-identified patent and that said Letters Patent is hereby corrected as shown below:

Col. 9, line 32, claim 1: "adsorptive duet comprising:" should read --adsorptive duct comprising:--

Col. 10, line 9, claim 9: "adsorptive duet according" should read --adsorptive duct according--

Signed and Sealed this

Eleventh Day of July, 2006

JON W. DUDAS  
*Director of the United States Patent and Trademark Office*